United States Patent
Watanabe et al.

[11] Patent Number: 6,064,580
[45] Date of Patent: May 16, 2000

[54] SWITCHING POWER SUPPLY

[75] Inventors: Haruo Watanabe; Haruhiko Hatakeyama, both of Hanno, Japan

[73] Assignee: Shindengen Electric Manufacturing Co., Ltd., Tokyo, Japan

[21] Appl. No.: 09/262,917

[22] Filed: Mar. 5, 1999

[30] Foreign Application Priority Data

Mar. 9, 1998 [JP] Japan ................... 10-074930

[51] Int. Cl.⁷ .......................... H02M 3/335; H02M 7/04; H02M 7/217
[52] U.S. Cl. ............... 363/17; 363/127; 363/89
[58] Field of Search .................. 363/17, 16, 15, 363/132, 127, 98, 89

[56] References Cited

U.S. PATENT DOCUMENTS

| | | | |
|---|---|---|---|
| 4,441,146 | 4/1984 | Vinciarelli | 363/20 |
| 5,243,509 | 9/1993 | Laeuffer | 363/17 |
| 5,822,198 | 10/1998 | Fraidlin et al. | 363/17 |
| 5,907,481 | 5/1999 | Svardsjo | 363/25 |

FOREIGN PATENT DOCUMENTS

| | | |
|---|---|---|
| 0 165 087 A1 | 12/1985 | European Pat. Off. . |
| 0 670 624 A1 | 9/1995 | European Pat. Off. . |

OTHER PUBLICATIONS

J.A. Cobos, et al.; "Optimized Synchronous Rectification Stage for Low Output voltage (3.3V) DC/DC Conversion"; IEEE Power Electronics Specialists Conference (PESC) (1994); p902–p908, May 1994.

Ionel Dan Jitaru et al.; "Increasing the Utilization of the Transformer's Magnetic Core by Using Quasi–integrated Magnetics"; HFPC Power Conversion (Sep. 1996); p238–p908.

Eiji Sakai et al.; "synchronous Rectifier for Low Voltage Switching Converter"; Technical Report of IEICE; PE95–14 (1995–07); p9–p16.(with translation of relevant passages).

*Primary Examiner*—Edward H. Tso
*Assistant Examiner*—Rajnikant B. Patel
*Attorney, Agent, or Firm*—Armstrong, Westerman, Hattori, McLeland & Naughton

[57] ABSTRACT

A switching power supply has first and second switching elements that are alternately turned on to cause an alternating current to flow through a primary winding of a transformer. The alternating current flowing through the primary winding induces voltages respectively across first and second secondary windings of the transformer. Synchronous rectifying transistors are turned on by the voltages induced across the first and second secondary windings, causing a current to flow alternately through the first and second secondary windings. Either one of the first and second switching elements is turned on while the other is being turned off, except for short off-times in which both the first and second switching elements are prevented from being turned on. As a result, when currents flow through the first and second secondary windings, the synchronous rectifying transistors are turned on. Therefore, no current flows through internal parasitic diodes of the synchronous rectifying transistors, and hence any loss caused thereby is very small.

6 Claims, 11 Drawing Sheets

SWITCHING POWER SUPPLY

BACKGROUND OF THE INVENTION

1. Field of the Invention

The present invention relates to a switching power supply which is highly efficient in operation.

2. Description of the Related Art

FIGS. 1 and 2 of the accompanying drawings show conventional switching power supplies. The conventional switching power supply shown in FIG. 1 is of the general forward type. For making a highly efficient switching power supply, particularly a switching power supply with a low-voltage (e.g., 5 V or 3.3 V), high-current output capability, using the circuit shown in FIG. 1, since rectifying diodes $D_{101}$, $D_{102}$ connected to the secondary winding $N_{12}$ of a transformer $T_{101}$ cause a large power loss, it is often customary to employ synchronous rectifying MOSFETs in place of the rectifying diodes $D_{101}$, $D_{102}$. It is of importance to consider how these synchronous rectifying MOSFETs (also referred to as synchronous rectifying transistors) are to be driven to achieve a highly efficient switching power supply.

The conventional switching power supply shown in FIG. 2 employs synchronous rectifying transistors $Q_{102}$, $Q_{103}$ instead of the rectifying diodes.

The conventional switching power supply shown in FIG. 1 which employs the rectifying diodes suffers the same problems as those of the conventional switching power supply shown in FIG. 2 which employs the synchronous rectifying transistors, except that the synchronous rectifying transistors are driven in the conventional switching power supply shown in FIG. 2. Therefore, the conventional switching power supply shown in FIG. 2 will be described below.

FIG. 3 of the accompanying drawings shows the waveforms of voltages and currents in various parts of the conventional switching power supply shown in FIG. 2. FIG. 4 of the accompanying drawings shows an output voltage of the conventional switching power supply shown in FIG. 2 with respect to a duty cycle (the ratio of an on-time to an operating period of a switching element $Q_{101}$) thereof.

In FIG. 3, $T_1$ represents an operating period of the switching element $Q_{101}$, $T_{ON1}$ represents an on-time thereof, and $T_{off1}$, $T_{off2}$ represent an off-time thereof.

$V_{gs}(Q_{101})$, $I_d(Q_{101})$, and $V_{ds}(Q_{101})$ represent a gate voltage, a drain current, and a drain-to-source voltage, respectively, of the switching element $Q_{101}$, and $V(N_{11})$ represents a voltage across the primary winding $N_{11}$ of the transformer $T_{101}$.

Of the voltage $V(N_{11})$ across the primary winding of the transformer $T_{101}$, a voltage $V(_1)$ in the off-time $T_{off1}$ of the switching element $Q_{101}$ is generated to reset the transformer $T_{101}$, after it has been excited in the on-time $T_{ON1}$ of the switching element $Q_{101}$. The voltage $V(h_1)$ is generated such that an integral of the voltage with respect to time in the on-time will be equal to an integral of the voltage with respect to time in the off-time.

The waveform of the voltage $V(N_{11})$ in the off-time $T_{off1}$ is determined depending on the magnetizing inductance and the capacitance between output terminals of the switching element $Q_{101}$. When the voltage of an input power supply $V_{in}$ and an output current supplied to a load vary, the duty cycle of the switching element $Q_{101}$ varies to keep the output voltage constant, and the voltage $V(h_1)$ and the off-times $T_{off1}$, $T_{off2}$ also vary.

In order to reset the transformer $T_{101}$ in the off-time $T_{off1}$ by exactly the same quantity as it has been excited in the on-time $T_{ON1}$ under any input and output conditions, it is necessary to sufficiently provide the off-time $T_{off2}$ in which no voltage is induced across the primary winding $N_{11}$, after the resetting of the transformer $T_{101}$. As described later on, the need to increase the off-time $T_{off2}$ poses a serious problem.

In FIG. 3, $V_{ds}(Q_{102})$ represents a drain-to-source voltage of the synchronous rectifying transistor $Q_{102}$, and $V_{ds}(Q_{103})$ represents a drain-to-source voltage of the synchronous rectifying transistor $Q_{103}$. These voltages are voltages converted from the voltage $V(N_{11})$, in the respective off-and on-times $T_{off1}$, $T_{ON1}$, across the primary winding $N_{11}$ of the transformer $T_{101}$ with the turns ratio of the primary and secondary windings $N_{11}$, $N_{12}$ of the transformer $T_{101}$.

One major problem encountered in making a highly efficient switching power supply using the circuit shown in FIG. 2 is that since the drain-to-source voltage $V_{ds}(Q_{102})$ of the synchronous rectifying transistor $Q_{102}$ is large as shown in FIG. 3, the synchronous rectifying transistor $Q_{102}$ has a large on-state resistance and causes a large power loss, resulting in a reduction in the switching power supply efficiency.

Specifically, though the synchronous rectifying transistor $Q_{102}$ should have a smaller on-state resistance for higher switching power supply efficiency, MOSFETs have such a general tendency that their on-state resistance is higher as the drain-source breakdown voltage is higher.

The voltage $V(N_{11})$ in the off-time $T_{off1}$ across the primary winding $N_{11}$ of the transformer $T_{101}$ is of a sine wave because it resonates with the magnetizing inductance and the capacitance between the drain and source of the switching element $Q_{101}$, and hence has a large maximum level. Furthermore, since the voltage $V(N_{11})$ varies greatly depending on the input and output conditions, the synchronous rectifying transistor $Q_{102}$ is required to have a large dielectric strength between the drain and source thereof and hence a large on-state resistance.

The above problem holds true for the conventional switching power supply shown in FIG. 1 where the rectifying diode $D_{101}$, is used in place of the synchronous rectifying transistor $Q_{102}$.

The problem of the dielectric strength of the synchronous rectifying transistor $Q_{102}$ is also the problem of the dielectric strength of the switching element $Q_{101}$. One conventional way of limiting the dielectric strength to a certain voltage is to use a clamping circuit, which comprises a diode, a capacitor, and a resistor, between the terminals of the primary winding $N_{11}$ of the transformer $T_{101}$. Though the clamping circuit is capable of clamping the voltage to a certain level, however, the efficiency is lowered because the magnetization energy of the transformer $T_{101}$ is consumed by the resistance of the clamping circuit. According to another conventional way of clamping the voltage, a tertiary winding is added to the transformer $T_{101}$, and connected to the input power supply $V_{in}$ via a diode, thus providing a clamping circuit.

With the latter conventional clamping circuit, most of the excitation energy of the transformer $T_{101}$ flows to the input power supply $V_{in}$. When this current flows through the diode of the clamping circuit, the diode develops a voltage drop which causes a power consumption resulting in a reduction in the efficiency. In addition, the transformer $T_{101}$ is large in size and complex in structure because of the added tertiary winding, and the tertiary winding suffers an increased conduction loss.

Another drawback which results from making a highly efficient switching power supply using the circuit shown in FIG. 2 is that because of the off-time $T_{off2}$ shown in FIG. 3, the synchronous rectifying transistor $Q_{103}$ cannot be energized for the entire period in which the switching element $Q_{101}$ is turned off, resulting in a reduction in the switching power supply efficiency. This drawback is inherent in using synchronous rectifying transistors, and is the most serious in the manufacture of highly efficient switching power supplies. In the on-time $T_{ON1}$ of the switching element $Q_{101}$, the synchronous rectifying transistor $Q_{103}$ is turned off and the synchronous rectifying transistor $Q_{102}$ is turned on, and a current through a choke coil $L_{10}$ flows through the synchronous rectifying transistor $Q_{102}$. In the off-time $T_{off1}$ of the switching element $Q_{101}$, the synchronous rectifying transistor $Q_{102}$ is turned off and the synchronous rectifying transistor $Q_{103}$ is turned on, and a current through a choke coil $L_{10}$ flows through the synchronous rectifying transistor $Q_{103}$.

The gate terminals of the synchronous rectifying transistors $Q_{102}$, $Q_{103}$ are energized by the voltage across the secondary winding $N_{12}$ of the transformer $T_{101}$. When one of the synchronous rectifying transistors $Q_{102}$, $Q_{103}$ is turned on, the gate voltage thereof comes from the drain-to-source voltage of the other synchronous rectifying transistor which is turned off.

The switching element $Q_{101}$ has the off-times $T_{off1}$, $T_{off2}$. As can be seen from FIG. 3, since the drain-to-source voltage $V_{ds}(Q_{102})$ of the synchronous rectifying transistor $Q_{102}$ has a certain level in the off-time $T_{off1}$, the synchronous rectifying transistor $Q_{103}$ can be energized in the off-time $T_{off1}$. However, in the off-time $T_{off2}$, the synchronous rectifying transistor Q103 cannot be energized because the drain-to-source voltage $V_{ds}(Q_{102})$ is nil. Therefore, the synchronous rectifying transistor $Q_{103}$ is turned off in the off-time $T_{off2}$. During this time, a current through the choke coil $L_{10}$ flows through a body diode of the synchronous rectifying transistor $Q_{103}$, i.e., a parasitic diode inserted from the source terminal to the drain terminal thereof because of the MOSFET structure. Inasmuch as a voltage drop across the body diode is much greater than a voltage drop caused when the synchronous rectifying transistor $Q_{103}$ is turned on, the power loss in the off-time $T_{off2}$ is increased, reducing the switching power supply efficiency.

Still another shortcoming is that the choke coil of the output filter is large because an output ripple voltage is high. Stated otherwise, if a chock coil of a certain size is used to keep the output ripple voltage to a prescribed level, then the iron loss and copper loss of the chock coil are increased, indirectly lowering the efficiency of the switching power supply.

In FIG. 3, the drain-to-source voltage $V_{ds}(Q_{103})$ of the synchronous rectifying transistor $Q_{103}$ is the same as a voltage V(P) at a point P shown in FIG. 2. The voltage V(P) is averaged by an output filter, which comprises the choke coil $L_{10}$ and a capacitor $C_{10}$, into an output voltage $V_{out}$ free of alternating current components. The output voltage $V_{out}$ is indicated in relation to the drain-to-source voltage $V_{ds}(Q_{103})$ in FIG. 3. The drain-to-source voltage $V_{ds}(Q_{103})$ and the output voltage $V_{out}$ across the capacitor $C_{10}$ are applied respectively to the terminals of the choke coil $L_{10}$. The difference between the drain-to-source voltage $V_{ds}(Q_{103})$ and the output voltage $V_{out}$ determines a ripple current $I(L_{10})$ flowing through the choke coil $L_{10}$. The product of the ripple current $I(L_{10})$ and the equivalent series resistance of the capacitor $C_{10}$ approximately determines the value of an output ripple voltage.

FIG. 4 shows an output voltage of the conventional switching power supply shown in FIG. 2 with respect to a duty cycle thereof, as described above. As can be understood from FIG. 4, since the output voltage is proportional to the duty cycle, the duty cycle is set to nearly 0.5 generally when the input and output conditions are rated conditions. According to the waveform of the drain-to-source voltage $V_{ds}(Q_{103})$, the ratio of the period in which the drain-to-source voltage $V_{ds}(Q_{103})$ is nil, i.e., the sum of the off-times $T_{off1}$, $T_{off2}$, to the entire time, i.e., the operating period $T_1$, is about 50%, so that the output ripple voltage is large. Stated otherwise, if a chock coil of a certain size is used to keep the output ripple voltage to a prescribed level, then the iron loss and copper loss of the chock coil are increased, indirectly lowering the efficiency of the switching power supply.

As described above, when a highly efficient switching power supply is to be constructed using the circuit shown in FIG. 2, the rectifying elements of the rectifying circuit connected to the secondary winding of the transformer cause a large power loss, and it is important to consider how the power loss can be reduced. Recently, efforts have been made to use synchronous rectifying transistors in place of the rectifying elements for there by reducing their conduction loss. It is also important to pay attention to effective energization of the synchronous rectifying transistors.

SUMMARY OF THE INVENTION

It is an object of the present invention to provide a switching power supply which employs rectifying elements of low dielectric strength that suffer a relatively small power loss, and allows synchronous rectifying transistors used as such rectifying elements to be energized for an entire period, so that the switching power supply can operate highly efficiently.

According to an aspect of the present invention, there is provided a power supply circuit comprising first and second choke coils, first and second capacitors, first and second switching elements each comprising a MOSFET, first and second synchronous rectifying transistors each comprising a MOSFET, a transformer having a primary winding and first and second secondary windings which are magnetically coupled to the primary winding, the first and second switching elements being connected in series with each other at a junction, jointly making up a series-connected circuit, the primary winding and the first choke coil having respective terminals connected to the junction between the first and second switching elements, the first and second capacitors being connected in series with each other at a junction, jointly making up a series-connected circuit, the primary winding having another terminal connected to the junction between the first and second capacitors, the series-connected circuit of the first and second switching elements and the series-connected circuit of the first and second capacitors being connected parallel to each other, jointly making up a parallel-connected circuit, and a power supply for applying a voltage between a terminal of the parallel-connected circuit and another terminal of the first choke coil, the arrangement being such that when the first and second switching elements are alternately turned on, an alternating current flows through the primary winding to induce alternating-current voltages respectively across the first and second secondary windings for thereby alternately turning on the first and second synchronous rectifying transistors to cause a current to flow alternatively through the first and second secondary windings for supplying a current to the second choke coil.

According to another aspect of the present invention, there is also provided a power supply circuit comprising first and second choke coils, first and second capacitors, first and second switching elements each comprising a MOSFET, first and second synchronous rectifying transistors each comprising a MOSFET, a transformer having a primary winding and first and second secondary windings which are magnetically coupled to the primary winding, the first and second switching elements being connected in series with each other at a junction, jointly making up a series-connected circuit, the primary winding and the first choke coil having respective terminals connected to the junction between the first and second switching elements, the second capacitor being connected parallel to the series-connected circuit of the first and second switching elements, jointly making up a parallel-connected circuit, the parallel-connected circuit having a terminal connected by the first capacitor to another terminal of the primary winding, and a power supply for applying a voltage between a junction between the parallel-connected circuit and the first capacitor, and another terminal of the first choke coil, the arrangement being such that when the first and second switching elements are alternately turned on, an alternating current flows through the primary winding to induce alternating-current voltages respectively across the first and second secondary windings for thereby alternately turning on the first and second synchronous rectifying transistors to cause a current to flow alternatively through the first and second secondary windings for supplying a current to the second choke coil.

According to still another aspect of the present invention, there is further provided a power supply circuit comprising first and second choke coils, first and second capacitors, first and second switching elements each comprising a MOSFET, first and second synchronous rectifying transistors each comprising a MOSFET, a transformer having a primary winding, first and second secondary windings which are magnetically coupled to the primary winding, and a tertiary winding which is magnetically coupled to the primary winding and the first and second secondary windings, the primary winding and the first capacitor being connected in series with each other, jointly making up a series-connected circuit, the first switching element being connected parallel to the series-connected circuit of the primary winding and the first capacitor, jointly making up a parallel-connected circuit, the parallel-connected circuit having a terminal connected to a terminal of the first choke coil, and a power supply for applying a voltage between another terminal of the parallel-connected circuit and another terminal of the first choke coil, the tertiary winding and the second capacitor being connected in series with each other, jointly making up a series-connected circuit, the second switching element being connected parallel to the series-connected circuit of the tertiary winding and the second capacitor, the arrangement being such that when the first and second switching elements are alternately turned on, an alternating current flows through the primary winding to induce alternating-current voltages respectively across the first and second secondary windings for thereby alternately turning on the first and second synchronous rectifying transistors to cause a current to flow alternatively through the first and second secondary windings for supplying a current to the second choke coil.

In each of the above power supply circuits, the first and second secondary windings have respective terminals connected to each other at a junction, the second choke coil having a terminal connected to the junction between the first and second secondary windings, and the first and second secondary windings have respective other terminals connected to each other by the first or second synchronous rectifying transistor at a junction, with an output voltage being extracted between the junction between the other terminals of the first and second secondary windings and another terminal of the second choke coil, the arrangement being such that a voltage at the other terminal of the second secondary winding is applied to a gate terminal of one of the first and second synchronous rectifying transistors which is connected to the first secondary winding, and a voltage at the other terminal of the first secondary winding is applied to a gate terminal of one of the first and second synchronous rectifying transistors which is connected to the second secondary winding.

Either one of the first and second switching elements is turned on for an on-time except for a relatively short off-time in which both of the first and second switching elements are prevented from being turned on at the same time, the on-time being variable to keep constant the output voltage extracted from the second choke coil.

The power supply circuit further comprises an output capacitor for smoothing the output voltage.

The above and other objects, features, and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
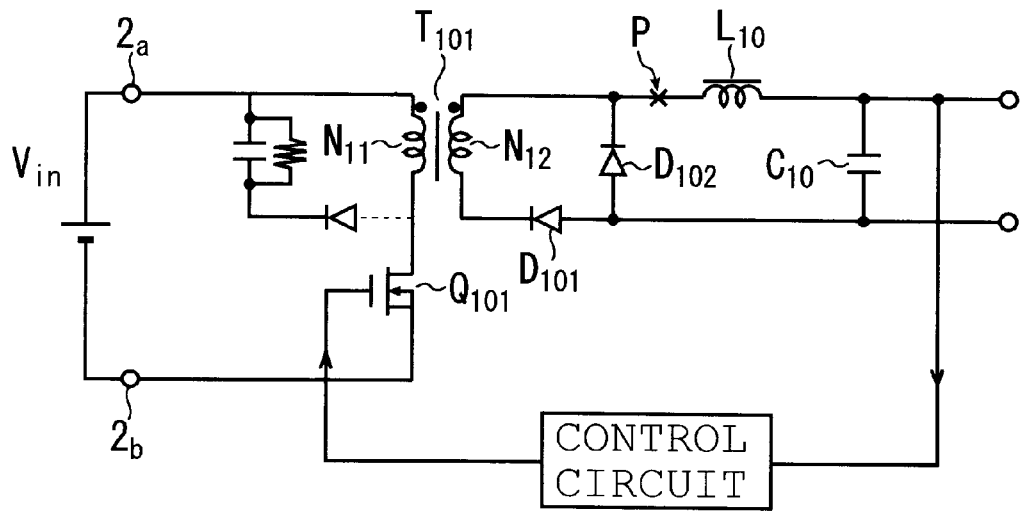
FIG. 1 is a circuit diagram of a conventional switching power supply.
Figure 2:
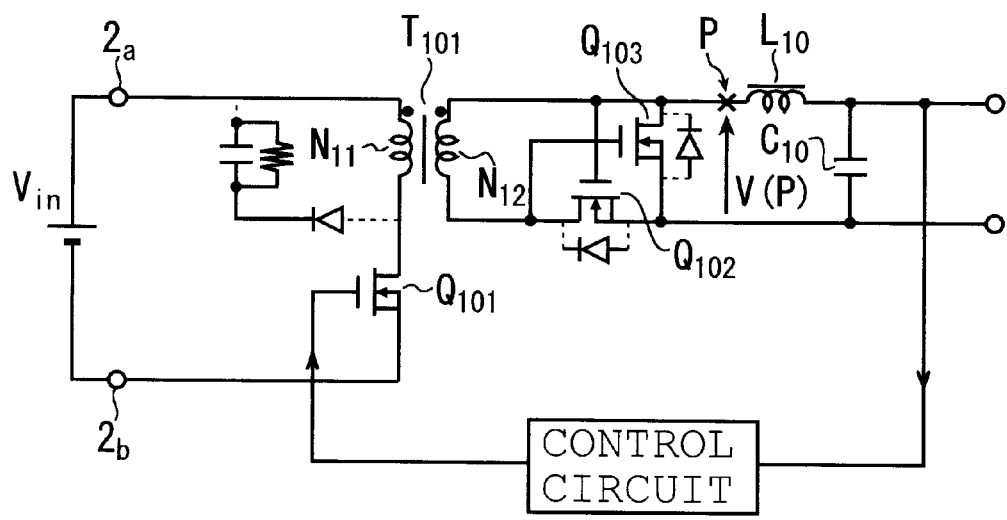
FIG. 2 is a circuit diagram of another conventional switching power supply.
Figure 3:
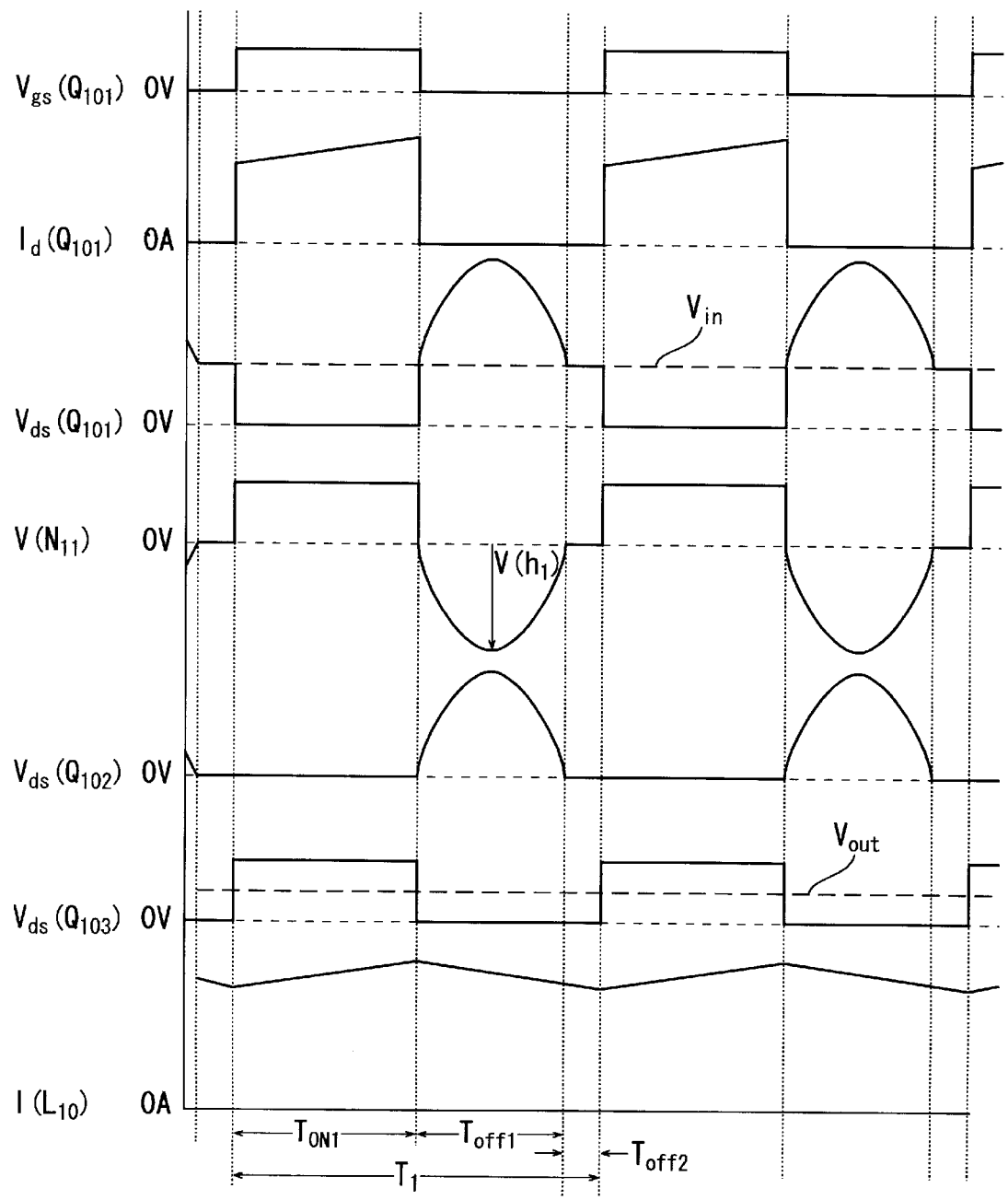
FIG. 3 is a diagram showing the waveforms of voltages and currents in various parts of the conventional switching power supply shown in FIG. 2.
Figure 4:
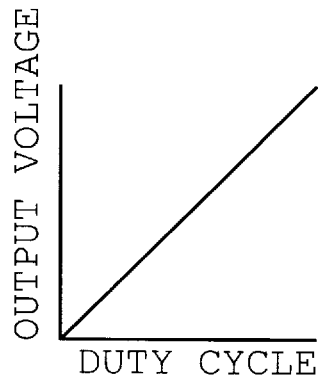
FIG. 4 is a diagram showing an output voltage of the conventional switching power supply shown in FIG. 2 with respect to a duty cycle (the ratio of on-time to operating period of a switching element $Q_{101}$) thereof.
Figure 5:
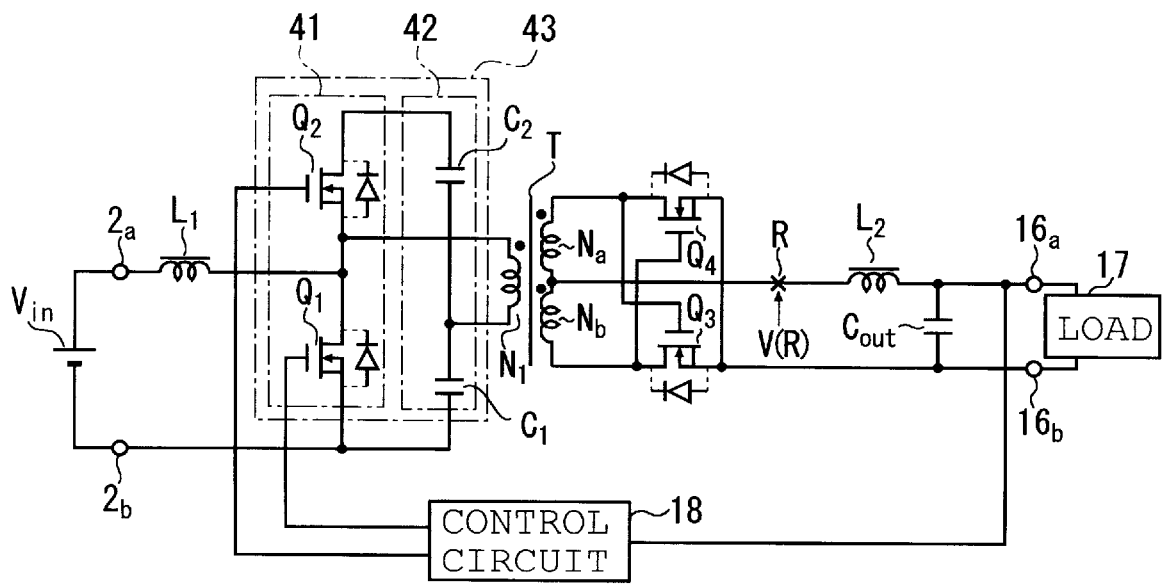
FIG. 5 is a circuit diagram of a switching power supply according to a first embodiment of the present invention.

As shown in FIG. 5, a switching power supply according to a first embodiment of the present invention has an input power supply $V_{in}$, a pair of input terminals $2_a$, $2_b$, a first choke coil $L_1$, a pair of first and second switching elements $Q_1$, $Q_2$, a pair of first and second capacitors $C_1$, $C_2$, a transformer T having a primary winding $N_1$ and a pair of first and second secondary windings $N_a$, $N_b$, a pair of first and second synchronous rectifying transistors $Q_3$, $Q_4$, an output filter comprising a second choke coil $L_2$ and an output capacitor $C_{out}$, a pair of output terminals $16_a$, $16_b$, a load 17, and a control circuit 18.

The parts connected to the primary winding $N_1$ of the transformer T will be described in detail below.

The input power supply $V_{in}$ has a positive terminal connected to the input terminal $2_a$ and a negative terminal connected to the input terminal $2_b$ which is kept at ground potential.

Each of the first and second switching elements $Q_1$, $Q_2$ comprises an n-channel MOSFET. The first switching element $Q_1$ has a drain terminal connected to the source terminal of the second switching element $Q_2$ and a source terminal connected to ground. The first and second switching elements $Q_1$, $Q_2$ jointly make up a series-connected circuit 41. Diodes which are shown connected respectively across the first and second switching elements $Q_1$, $Q_2$ are parasitic diodes in their MOSFETS.

The first and second capacitors $C_1$, $C_2$ are connected in series with other and jointly make up a series-connected circuit 42 which has a terminal connected to the drain terminal of the second switching element $Q_2$ and an opposite terminal connected to ground. The series-connected circuit 42 is connected parallel to the series-connected circuit 41, jointly making up a parallel-connected circuit 43.

The first choke coil $L_1$ has a terminal connected to the input terminal 2a connected to the positive terminal of the input power supply $V_{in}$. The other terminal of the first choke coil $L_1$ is connected to the junction between the first and second switching elements $Q_1$, $Q_2$.

The junction between the first and second switching elements $Q_1$, $Q_2$ is connected to a terminal of the primary winding $N_1$ of the transformer T. The other terminal of the primary winding $N_1$ is connected to the junction between the first and second capacitors $C_1$, $C_2$.

The parts connected to the first and second secondary windings $N_a$, $N_b$ of the transformer T will be described in detail below. Each of the first and second synchronous rectifying transistors $Q_3$, $Q_4$ comprises an n-channel MOSFET. The first and second secondary windings $N_a$, $N_b$ have terminals connected to each other and other terminals connected to the gate terminals of the first and second synchronous rectifying transistors $Q_3$, $Q_4$. The junction between the first secondary winding $N_a$ and the gate terminal of the first synchronous rectifying transistor $Q_3$ is connected to the drain terminal of the second synchronous rectifying transistor $Q_4$. Similarly, the junction between the second secondary winding $N_b$ and the gate terminal of the second synchronous rectifying transistor $Q_4$ is connected to the drain terminal of the first synchronous rectifying transistor $Q_3$.

The first and second synchronous rectifying transistors $Q_3$, $Q_4$ have respective source terminals connected to each other, and the output terminal $16_b$ which is held at ground potential is connected to the junction between the source terminals of the first and second synchronous rectifying transistors $Q_3$, $Q_4$.

The first and second secondary windings $N_a$, $N_b$ are magnetically coupled to the primary winding $N_1$ of the transformer T. The terminal of the primary winding $N_1$ which is connected to the first and second switching elements $Q_1$, $Q_2$ is of the same polarity as that of the terminal of the first secondary winding $N_a$ which is connected to the second synchronous rectifying transistor $Q_4$, and also of the same polarity as that of the terminal of the second secondary winding $N_b$ which is connected to the first secondary winding $N_a$.

The junction between the first and second secondary windings $N_a$, $N_b$ is connected to a terminal of the second choke coil $L_2$, whose other terminal is connected to the output terminal $16_a$ which is kept at a positive potential.

The output capacitor $C_{out}$ is connected between the output terminals $16_a$, $16_b$. The load 17 is also connected between the output terminals $16_a$, $16_b$ parallel to the output capacitor $C_{out}$.

Figure 6:
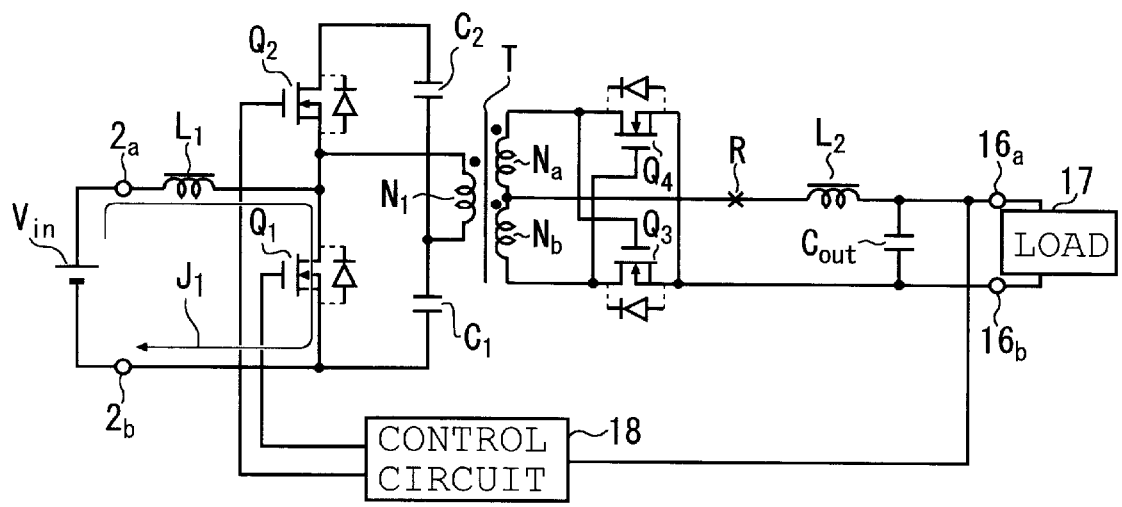
FIG. 6 is a circuit diagram showing a current path in the switching power supply according to the first embodiment of the present invention.

After a voltage from the input power supply $V_{in}$ is applied, when the first switching element $Q_1$ is turned on with the second switching element $Q_2$ being turned off, a current flows along a path indicated by $J_1$ in FIG. 6, storing energy in the first choke coil $L_1$.

Then, when the first switching element $Q_1$ is turned off and the second switching element $Q_2$ is turned on, an electromotive force is induced across the choke coil $L_1$ by the energy stored in the choke coil $L_1$, rendering the second switching element $Q_2$ conductive in the reverse direction. A current flows in a path indicated by $J_2$ in FIG. 7 from the source terminal to the drain terminal of the second switching element $Q_2$, charging the first and second capacitors $C_1$, $C_2$.

The state in which the first and second capacitors $C_1$, $C_2$ are charged is referred to as a steady state. When the first switching element $Q_1$ is turned off and the second switching element $Q_2$ is turned on in the steady state, the second capacitor $C_2$ is discharged, causing a current to flow from the drain terminal of the second switching element $Q_2$ to the source terminal thereof to the primary winding $N_1$ along a path indicated by $J_3$ in FIG. 8.

Figure 9:
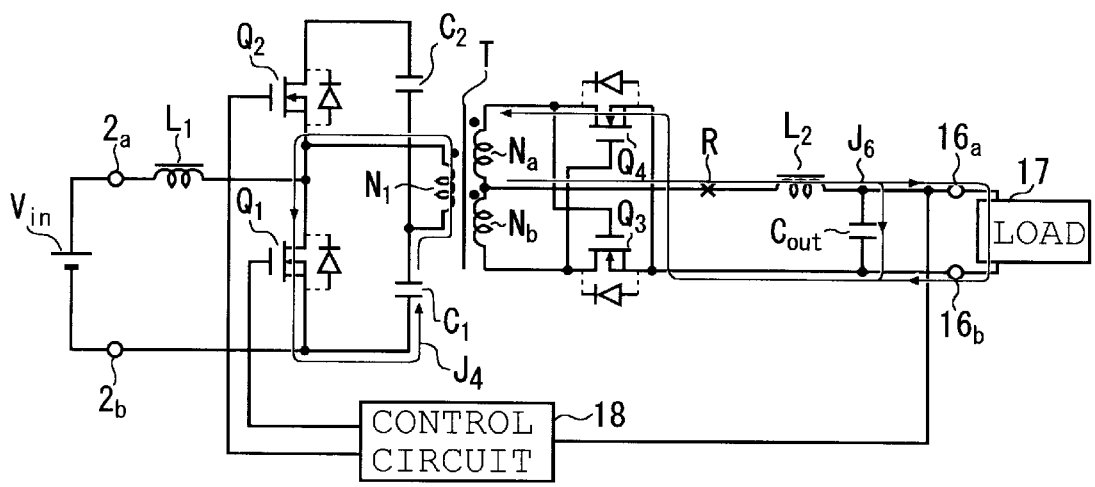
FIG. 9 is a circuit diagram showing other current paths in the switching power supply according to the first embodiment of the present invention.

When the first switching element $Q_1$ is turned on and the second switching element $Q_2$ is turned off in the steady state, the first capacitor $C_1$ is discharged, causing a current to flow from the drain terminal of the first switching element $Q_1$ to the source terminal thereof to the primary winding $N_1$ along a path indicated by $J_4$ in FIG. 9. At this time, the current flows through the primary winding $N_1$ in the direction opposite to the direction in which it flows when the second switching element $Q_2$ is turned on.

Operation of the switching power supply shown in FIG. 5 in the steady state will be described below with reference to FIG. 10.

Figure 10:
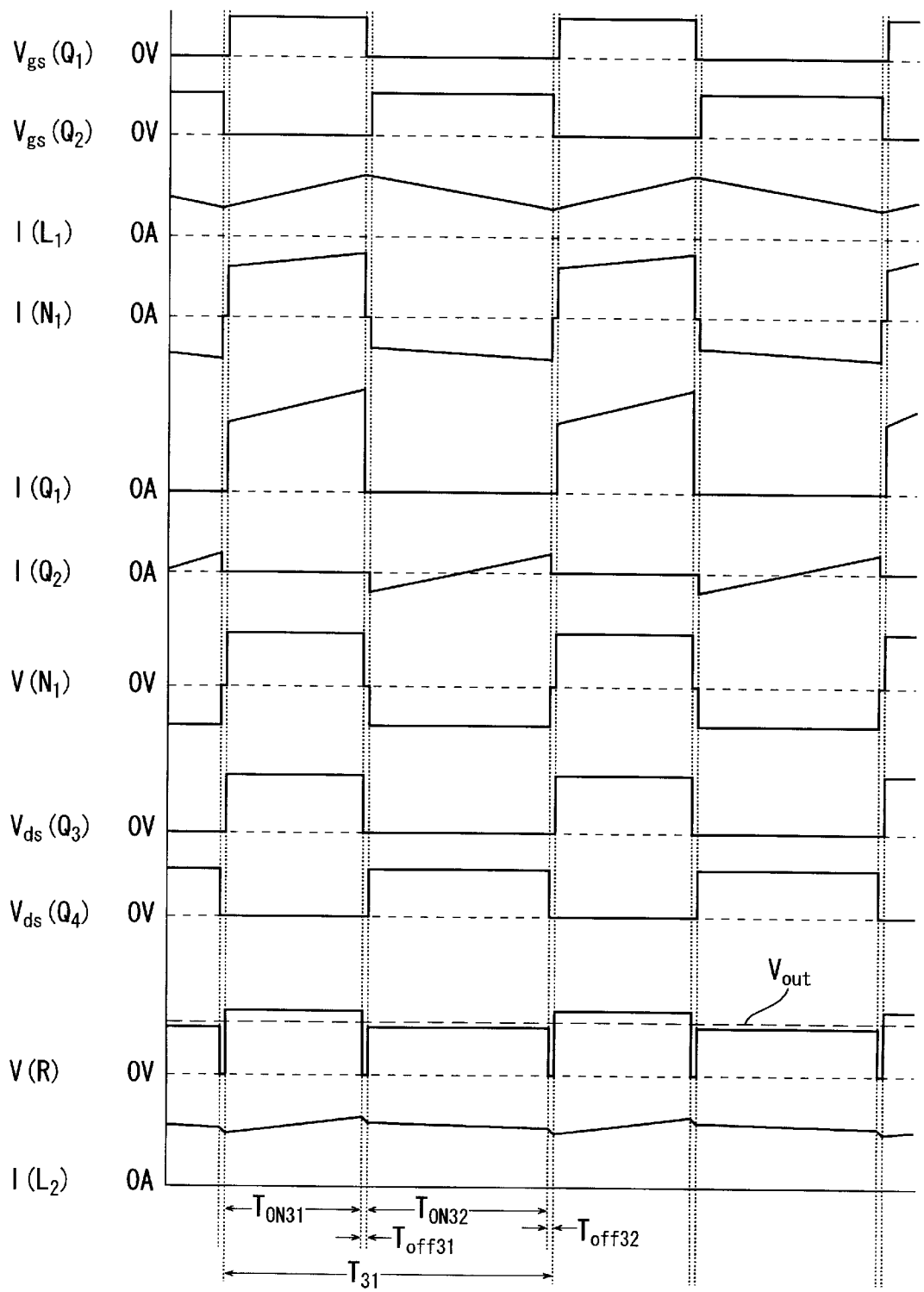
FIG. 10 is a diagram showing the waveforms of voltages and currents in various parts of the switching power supply according to the first embodiment of the present invention.

In FIG. 10, $T_{31}$ represents an operating period of the switching elements, $T_{ON31}$ represents an on-time of the first switching element $Q_1$, $T_{ON32}$ represents an on-time of the second switching element $Q_2$, and $T_{off31}$, $T_{off32}$ represent off-times in which both the first and second switching elements $Q_1$, $Q_2$ are turned off. The off-times $T_{off31}$, $T_{off32}$ are a period in which both the first and second switching elements $Q_1$, $Q_2$ are prevented from being turned on at the same time, so that series-connected circuit of the first and second capacitors $C_1$, $C_2$ is prevented from being short-circuited. The off-times $T_{off31}$, $T_{off32}$ may be of a minimum required period in view of delay times of the first and second switching elements $Q_1$, $Q_2$ upon switching thereof.

In FIG. 10, $V_{gs}(Q_1)$, $V_{gs}(Q_2)$ represent gate drive voltages of the first and second switching elements $Q_1$, $Q_2$, respectively.

It can be seen from FIG. 10 that the first and second switching elements $Q_1$, $Q_2$ are controlled by the control circuit 18 such that when one of the first and second switching elements $Q_1$, $Q_2$ is turned on, the other is turned off, and vice versa except for the short off-times $T_{off31}$, $T_{off32}$, and that the ratio of the on-time of one of the first and second switching elements $Q_1$, $Q_2$ to the operating period $T_{31}$, i.e., the duty cycle, is varied to produce a constant output voltage $V_{out}$.

In FIG. 10, $I(L_1)$ represents a current flowing through the first choke coil $L_1$, $I(N_1)$ and $V(N_1)$ represent a current flowing through and a voltage developed across the primary winding $N_1$ of the transformer T, respectively, $I(Q_1)$ and $I(Q_2)$ represent currents flowing through the first and second switching elements $Q_1$, $Q_2$, respectively, $V_{ds}(Q_3)$, $V_{ds}(Q_4)$ represent drain-to-source voltages of the first and second synchronous rectifying transistors $Q_3$, $Q_4$, respectively, V(R) represents a voltage at the junction (point R in FIG. 5) between the first and second secondary windings $N_a$, $N_b$ of the transformer T, and $I(L_2)$ represents a current flowing through the second choke coil $L_2$.

Prior to describing the waveforms of voltages and currents shown in FIG. 10, operation in the steady state of the switching power supply shown in FIG. 5 will be described below with reference to FIGS. 12a, 12b, and 12c.

Figure 12A:
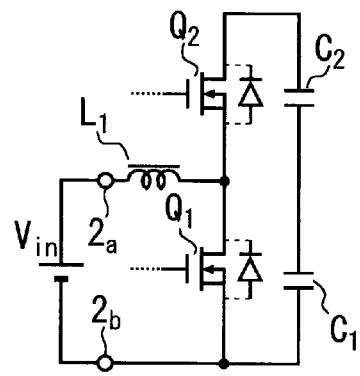
FIGS. 12a through 12c are circuit diagrams illustrative of the manner in which the switching power supply according to the first embodiment of the present invention operates.
Figure 12B:
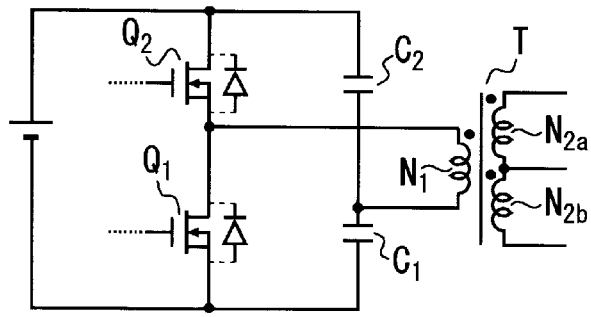
Figure 12C:
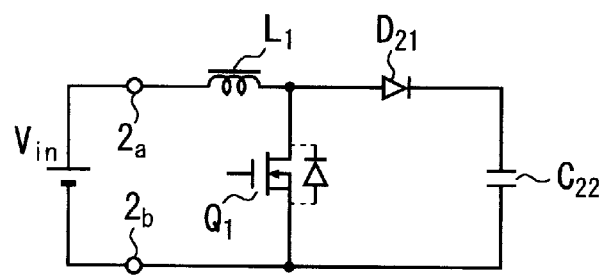

Operation of the switching power supply shown in FIG. 5 may be considered as a combination of operation of the circuits shown in FIGS. 12a, 12b. In the switching power supply shown in FIG. 5, the second switching element $Q_2$ is turned off in the on-time of the first switching element $Q_1$, and turned on in the off-time of the first switching element $Q_1$. Therefore, the second switching element $Q_2$ operates in the same manner as a commutating diode $D_{21}$ in a booster chopper circuit shown in FIG. 12c. Therefore, the circuit shown in FIG. 12a may be replaced with the circuit shown in FIG. 12c, and hence may be regarded as a booster chopper circuit.

Since the series-connected circuit of the first and second capacitors $C_1$, $C_2$ shown in FIG. 12b is charged to the single polarity as described above with reference to FIG. 7, it is possible for the first and second capacitors $C_1$, $C_2$ to maintain a certain DC voltage if the first and second capacitors $C_1$, $C_2$ have a sufficiently large capacitance. Consequently, the series-connected circuit of the first and second switching elements $Q_1$, $Q_2$ may be considered as a half-bridge circuit with the series-connected circuit of the first and second capacitors $C_1$, $C_2$ serving as its input power supply.

The operation of the switching power supply shown in FIG. 5 may be considered as a combination of the operation of the booster chopper circuit shown in FIG. 12a in which the input power supply $V_{in}$ supplies electric energy to the series-connected circuit of the first and second capacitors $C_1$, $C_2$ and the operation of the half-bridge circuit shown in FIG. 12b in which the series-connected circuit of the first and second capacitors $C_1$, $C_2$ supplies electric energy to the load 17 (a quantitative analysis of the above operation will be described later on).

The first and second capacitors $C_1$, $C_2$ operate with a certain DC voltage because of the operation of the booster chopper circuit shown in FIG. 12a. In the half-bridge circuit shown in FIG. 12b, the ratio of the on-time of one of the first switching element $Q_1$ to the operating period $T_{31}$ is varied.

The waveforms of voltages and currents shown in FIG. 10 will be described in detail below.

In the on-time $T_{ON31}$ of the first switching element $Q_1$, the current $I(L_1)$ flows from the input power supply $V_{in}$ through the first choke coil $L_1$ to the first switching element $Q_1$. At this time, the current $I(L_1)$ flows along the path indicated by $J_1$ in FIG. 6, and has a waveform those gradient is indicated by $V_a/L_a$ where $V_a$ represents the voltage of the input power supply $V_{in}$ and $L_a$ represents the inductance of the first choke coil $L_1$.

When the first capacitor $C_1$ is discharged, the current $I(N_1)$ flows from the positive-voltage terminal of the first capacitor $C_1$ through the primary winding $N_1$ of the transformer T and the first switching element $Q_1$ back to the negative-voltage terminal (ground terminal) of the first capacitor $C_1$, along the path indicated by $J_4$ in FIG. 9. When the current $I(N_1)$ flows through the primary winding $N_1$, it induces a voltage across the second secondary winding $N_b$, turning on the second synchronous rectifying transistor $Q_4$. A voltage is then induced across the first secondary winding $N_a$, causing a current to flow along a path indicated by $J_6$ in FIG. 9. The current supplies electric energy to the load 17, and charges the output capacitor $C_{out}$. It is assumed that at this time the current flows through the primary winding $N_1$ in a positive direction.

The current flowing through the primary winding $N_1$ is equal to the sum of a current converted from the current flowing through the second choke current $L_2$ with the turns ratio of the transformer T and an magnetizing current of the transformer T.

As described above, the current which is equal to the sum of the current flowing through the first choke coil $L_1$ along the path indicated by $J_1$ in FIG. 6 and the current flowing through the primary winding $N_1$ along the path indicated by $J_4$ in FIG. 9 flows through the first switching element $Q_1$. This current has a waveform $I(Q_1)$ as shown in FIG. 10.

In the on-time $T_{ON32}$ in which the first switching element $Q_1$ is turned off and the second switching element $Q_2$ is turned on, the current $I(L_1)$ flows through the first choke coil $L_1$. The current $I(L_1)$ is generated by an electromotive force induced across the first choke coil $L_1$, and flows from the positive-voltage terminal of the first choke coil $L_1$ through the second switching element $Q_2$, the second capacitor $C_2$, the first capacitor $C_1$, and the input power supply $V_{in}$ back to the negative-voltage terminal of the first choke coil $L_1$, along the path indicated by $J_2$ in FIG. 7, charging the series-connected circuit of the first and second capacitors $C_1$, $C_2$. This current corresponds to the current flowing through the first choke coil $L_1$ and the diode $D_{21}$ with the first switching element $Q_1$ being turned off, in the booster chopper circuit shown in FIG. 12c.

The current has a waveform whose gradient is indicated by $(V_a-V_b)/L_a$ where $V_a$ represents the voltage of the input power supply $V_{in}$, $L_a$ represents the inductance of the first choke coil $L_1$, and $V_b$ represents the voltage across the series-connected circuit of the first and second capacitors $C_1$, $C_2$.

Figure 8:
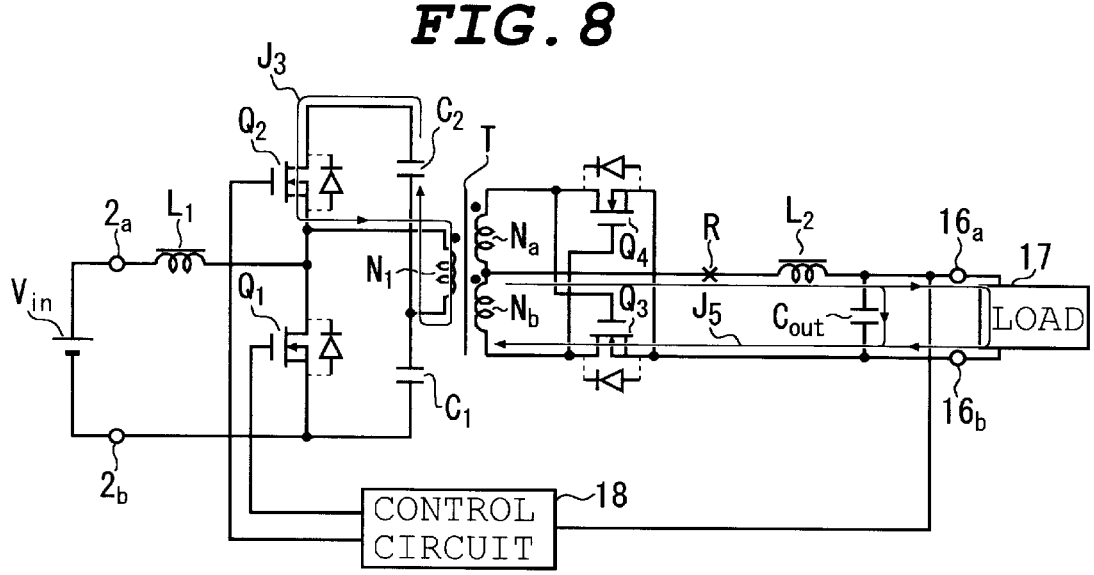
FIG. 8 is a circuit diagram showing other current paths in the switching power supply according to the first embodiment of the present invention.

In the on-time $T_{ON32}$ of the second switching element $Q_2$, the second capacitor $C_2$ is discharged, causing the current $I(N_1)$ to flow through the primary winding $N_1$ of the transformer T, along the path indicated by $J_3$ in FIG. 8. This current flows from the positive-voltage terminal of the second capacitor $C_2$ through the second switching element $Q_2$ and the primary winding $N_1$ back to the negative-voltage terminal of the second capacitor $C_2$.

At this time, the current flowing through the primary winding $N_1$ is equal to the sum of a current converted from the current flowing through the second choke current $L_2$ with the turns ratio of the transformer T and an magnetizing current of the transformer T.

Since the current flows through the primary winding $N_1$ along the path indicated by $J_3$ in FIG. 8, a positive voltage is applied to the gate terminal of the first synchronous rectifying transistor $Q_3$ by an electromotive force induced across the first secondary winding $N_a$, thus turning on the first synchronous rectifying transistor $Q_3$.

As a result, due to the electromotive force developed across the second secondary winding $N_b$, a current flows along a path indicated by $J_5$ in FIG. 8, supplying electric energy to the load 17 and charging the output capacitor $C_{out}$.

Figure 7:
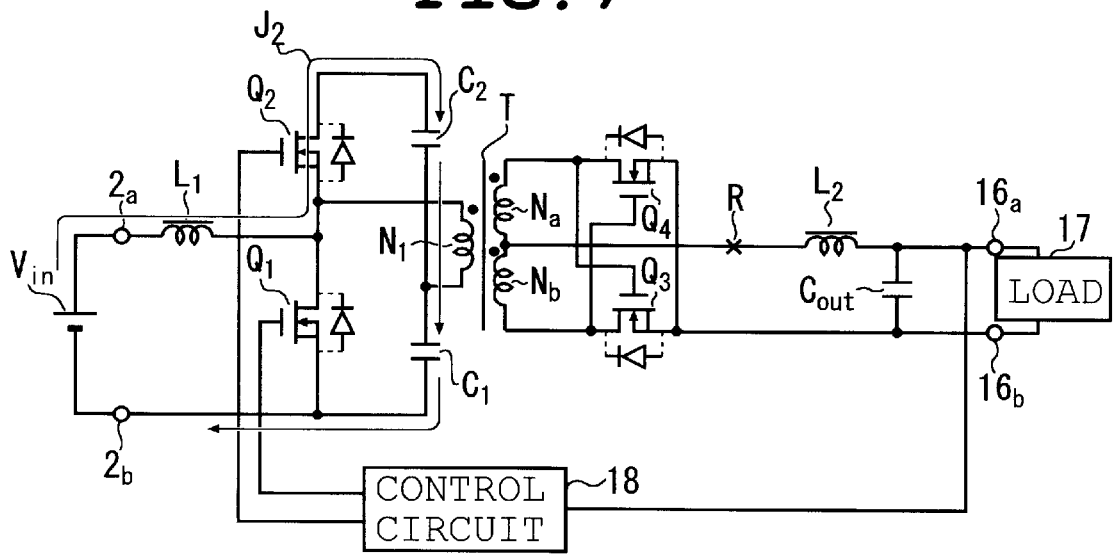
FIG. 7 is a circuit diagram showing another current path in the switching power supply according to the first embodiment of the present invention.

In the on-time $T_{ON32}$ of the second switching element $Q_2$, the electromotive force developed across the first choke coil $L_1$ causes a current to flow through the second switching element $Q_2$ in the direction to charge the first and second capacitors $C_1$, $C_2$ along the path indicated by $J_2$ in FIG. 7.

Therefore, in the on-time $T_{ON32}$ of the second switching element $Q_2$, the current flows from the drain terminal to the source terminal of the second switching element $Q_2$ along the path indicated by $J_3$ in FIG. 8 because of the discharging of the second capacitor $C_2$, and the current flows from the source terminal to the drain terminal of the second switching element $Q_2$ along the path indicated by $J_2$ in FIG. 7 because of the electromotive force developed across the first choke coil $L_1$.

As a consequence, a current which is the difference between the current $I(L_1)$ flowing through the first choke coil $L_1$ and the current $I(N_1)$ flowing through the primary winding $N_1$ of the transformer T flows through the second switching element $Q_2$. This current has a waveform indicated by $I(Q_2)$ in FIG. 10.

In FIG. 10, $V(N_1)$ represents a voltage developed across the primary winding $N_1$ of the transformer T. This voltage in the on-time $T_{ON31}$ corresponds to the voltage across the first capacitor $C_1$ because the first switching element $Q_1$ is turned on, and in the on-time $T_{ON32}$ corresponds to the voltage across the second capacitor $C_2$ because the second switching element $Q_2$ is turned on.

In FIG. 10, $V_{ds}(Q_3)$, $V_{ds}(Q_4)$ represent, respectively, drain-to-source voltages of the first and second synchronous rectifying transistors $Q_3$, $Q_4$ in FIG. 5. These drain-to-source voltages serve as respective gate drive voltages of the second and first synchronous rectifying transistors $Q_4$, $Q_3$.

In FIG. 10, $V(R)$ represents a voltage at the point R in FIG. 5 between the first and second secondary windings $N_a$, $N_b$ of the transformer T, and $I(L_2)$ represents a current flowing through the second choke coil $L_2$.

The drain-to-source voltages $V_{ds}(Q_3)$, $V_{ds}(Q_4)$ are voltages converted from the voltage $V(N_1)$ across the primary winding $N_1$ respectively in the on-times $T_{ON31}$, $T_{ON32}$ with the turns ratio between the primary winding $N_1$ and the first secondary winding $N_a$ (or the second secondary winding $N_b$). The voltage $V(R)$ at the point R is equal to the sum of the drain-to-source voltages $V_{ds}(Q_3)$, $V_{ds}(Q_4)$.

Of the voltage $V(R)$, $V_{out}$ represents the output voltage between the output terminals $16_a$, $16_b$. The voltage $V(R)$ at the point R and the output voltage $V_{out}$ are applied across the second choke coil $L_2$, causing a ripple current $I(L_2)$ to flow through the second choke coil $L_2$. A ripple voltage whose value is substantially determined by the product of the ripple current $I(L_2)$ and an equivalent series resistance of the output capacitor $C_{out}$ is generated in the output voltage.

As can be seen from the above description, according to the first embodiment shown in FIG. 5, either one of the drain-to-source voltages $V_{ds}(Q_3)$, $V_{ds}(Q_4)$ of the first and second synchronous rectifying transistors $Q_3$, $Q_4$ is generated at all times except for the short off-times $T_{off31}$, $T_{off32}$.

Therefore, when a voltage is induced across the first secondary winding $N_a$ or the second secondary winding $N_b$, applying a higher voltage to the source terminal of the second synchronous rectifying transistor $Q_4$ or the second synchronous rectifying transistor $Q_3$ than to the drain terminal thereof, a positive voltage is applied to the gate terminal of the synchronous rectifying transistor, turning on the synchronous rectifying transistor. Therefore, the synchronous rectifying transistor is prevented from being turned off, preventing a current from flowing from the source terminal to the drain terminal thereof through the internal parasitic diode, so that no large loss will be caused. The switching power supply according to the present invention is therefore free of "the problem of a large loss because of a long period of time in which the synchronous rectifying transistor could not be energized."

As can be understood from the waveforms of the drain-to-source voltages $V_{ds}(Q_3)$, $V_{ds}(Q_4)$, since the voltages applied to the first and second synchronous rectifying transistors $Q_3$, $Q_4$ are of rectangular waveforms, these voltages are prevented from being unduly increased whereas they posed a problem in the conventional circuit arrangement because they are of a resonating waveform. The switching power supply according to the present invention may thus employ synchronous rectifying transistors having a low dielectric strength and a low on-state resistance.

An output voltage of the switching power supply shown in FIG. 5 with respect to a duty cycle (the ratio of the on-time to the operating period of the switching element $Q_1$) thereof will be described with reference to FIG. 11.

It is assumed that the voltage of the input power supply $V_{in}$ is represented by $V_a$, the duty cycles of the respective first and second switching elements $Q_1$, $Q_2$ are represented by D, 1−D, respectively, the voltages across the first and second capacitors $C_1$, $C_2$ are represented by $V(C_1)$, $V(C_2)$, respectively, the turns ratio between the primary winding $N_1$ and the first secondary winding $N_a$ (or the second secondary winding $N_b$) is represented by n: 1, the drain-to-source voltages of the first and second synchronous rectifying transistors $Q_3$, $Q_4$ are represented by $V_{ds}(Q_3)$, $V_{ds}(Q_4)$, respectively, and the output voltage between the output terminals $16_a$, $16_b$ is represented by $V_{out}$. From the circuit arrangement of the booster chopper circuit shown in FIG. 12a, the following equation (1) is satisfied (it is also assumed that, in the following numerical analysis, voltage drops developed across the first and second switching elements $Q_1$, $Q_2$ and the first and second synchronous rectifying transistors $Q_3$, $Q_4$ when they are rendered conductive are negligibly small, and the off-times $T_{off31}$, $T_{off32}$ in which both the first and second switching elements $Q_1$, $Q_2$ are turned off are also negligibly small):

$$V(C_1)+V(C_2)=V_a/(1-D) \quad (1)$$

With respect to the operation of the core (magnetic material) of the transformer T, the quantity by which the core is excited in the on-time of the first switching element $Q_1$ is equal to the quantity by which the core is reset in the on-time of the second switching element $Q_2$. Therefore, the following equation (2) is satisfied:

$$V(C_1) \times D = V(C_2) \times (1-D) \quad (2)$$

From the equations (1), (2), the following equations (3), (4) are derived:

$$V(C_1)=V_a \quad (3)$$

$$V(C_2)=V_a \times D/(1-D) \quad (4)$$

Since the drain-to-source voltages of the first and second synchronous rectifying transistors $Q_3$, $Q_4$, at the time they are turned off are voltages converted from the voltages across the first and second capacitors $C_1$, $C_2$ with the turns ratio of the transformer T, the following equations (5), (6) are satisfied:

$$V_{ds}(Q_3)=V(C_1)/n=V_a/n \quad (5)$$

$$V_{ds}(Q_4)=V(C_2)/n=V_a \times D/\{(1-D) \times n\} \quad (6)$$

The output voltage between the output terminals $16_a$, $16_b$ is of a value produced by averaging the voltage at the point R with the output filter, and the voltage at the point R is equal to the sum of the drain-to-source voltages $V_{ds}(Q_3)$, $V_{ds}(Q_4)$ of the first and second synchronous rectifying transistors $Q_3$, $Q_4$. Therefore, if the switching period is represented by $T_0$, then the following equation (7) is satisfied:

$$\begin{aligned} V_{out} &= \frac{1}{T_0} \int_0^{T_0} V(R) dt \\ &= \frac{1}{T_0} \left\{ \int_0^{D \cdot T_0} V_{ds}(Q_3) dt + \int_{D \cdot T_0}^{T_0} V_{ds}(Q_4) dt \right\} \\ &= D \times V_{ds}(Q_3) + (1-D) \times V_{ds}(Q_4) \\ &= 2 \times V_a \times D/n \end{aligned} \quad (7)$$

Figure 11:
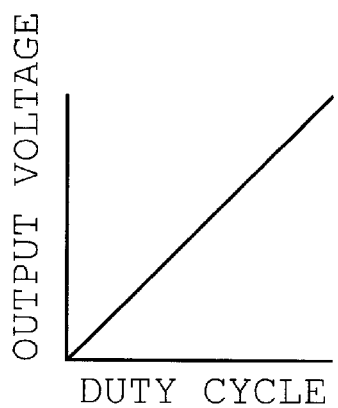
FIG. 11 is a diagram showing an output voltage of the switching power supply according to the first embodiment of the present invention with respect to a duty cycle (the ratio of on-time to operating period of a switching element $Q_1$) thereof.

From the equation (7), it can be seen that the output voltage $V_{out}$ of the switching power supply shown in FIG. 5 is proportional to the duty cycle D of the switching element $Q_1$, as shown in FIG. 11.

Since the output voltage $V_{out}$ is proportional to the duty cycle D of the switching element $Q_1$, as shown in FIG. 11, it is possible to set the duty cycle D to 0.5 provided the input and output conditions are rated conditions. At this time, both the drain-to-source voltages $V_{ds}(Q_3)$, $V_{ds}(Q_4)$ of the first and second synchronous rectifying transistors $Q_3$, $Q_4$ are represented by $V_a/n$ as can be understood from the equations (5), (6). Inasmuch as the drain-to-source voltages $V_{ds}(Q_3)$, $V_{ds}(Q_4)$ are variable about the value $V_a/n$ while keeping the rectangular waveform even when the input and output conditions are varied, the first and second synchronous rectifying transistors $Q_3$, $Q_4$ are not required to be of large dielectric strength and large on-state resistance unlike those of the conventional switching power supply.

The fact that the drain-to-source voltages $V_{ds}(Q_3)$, $V_{ds}(Q_4)$ are equal to each other (actually, they are slightly different from each other as the numbers of turns of the transformer T are integers) means that any changes in the voltage V(R) at the point R are very small. Because the voltage in the on-time $T_{ON31}$ and the voltage in the on-time $T_{ON32}$ are equal to each other or different from each other very slightly, the second choke coil $L_2$ may be small, and any power loss caused by the second choke coil $L_2$ may be small, so that the switching power supply may be highly efficient. Actually, the output filter is designed taking into account variations in the input and output conditions, but the second choke coil $L_2$ may still be small.

The above analytical results have experimentally been verified.

In FIG. 10, $I(N_1)$ represents a current flowing through the primary winding $N_1$ of the transformer T. Since the transformer T has a leakage inductance, the off-times $T_{off31}$, $T_{off31}$ in which both the first and second switching elements $Q_1$, $Q_2$ are turned off may be adjusted appropriately such that after one of the first and second switching elements $Q_1$, $Q_2$ is turned off and before the other of the first and second switching elements $Q_1$, $Q_2$ is turned on, a current due to the leakage inductance discharges the parasitic capacitor between the drain and source of the other switching element. As a result, the switching power supply can operate as a ZVS (Zero Voltage Switching) power supply.

Since the energy stored in the parasitic capacitor between the drain and source of the other switching element can be recovered, the efficiency of the switching power supply is increased.

As described above, with the switching power supply shown in FIG. 5, either one of the first and second synchronous rectifying transistors $Q_3$, $Q_4$ is energized at all times except for the short off-times $T_{off31}$, $T_{off32}$, i.e., the synchronous rectifying transistor through which the current flowing through the second choke coil $L_2$ flows is energized, and their applied drain-to-source voltage is low. Therefore, the first and second synchronous rectifying transistors $Q_3$, $Q_4$ may be of small dielectric strength and small on-state resistance, and at the same time the output filter may be small and any power loss caused by the output filter may be small.

As a consequence, the switching power supply is highly efficient in operation.

In the switching power supply according to the second embodiment shown in FIG. 5, each of the first and second switching elements $Q_1$, $Q_2$ comprises an n-channel MOSFET. However, one or both of the first and second switching elements $Q_1$, $Q_2$ may comprise a p-channel MOSFET.

Furthermore, each of the first and second switching elements $Q_1$, $Q_2$ is not limited to a MOSFET, but may comprise an IGBT.

In the switching power supply shown in FIG. 5, since the first and second switching elements $Q_1$, $Q_2$ are symmetrically positioned, the series-connected circuit of the input power supply $V_{in}$ and the first choke coil $L_1$ may be connected between the drain and source of the second switching element $Q_2$ rather than between the drain and source of the first switching element $Q_1$. The switching power supply thus modified operates in the same manner as described above except that the first and second switching elements $Q_1$, $Q_2$ are switched around.

In the switching power supply shown in FIG. 5, the full-wave rectifier circuit comprising two rectifiers is connected to the secondary windings $N_a$, $N_b$ of the transformer T. However, a half-wave rectifier circuit with one of the two rectifiers used as a freewheeling rectifier may be connected to the secondary windings $N_a$, $N_b$ of the transformer T, or a full-wave rectifier circuit comprising a bridge of four rectifiers may be connected to the secondary windings $N_a$, $N_b$ of the transformer T.

A process of driving the first and second synchronous rectifying transistors $Q_3$, $Q_4$ in the switching power supply shown in FIG. 5 will be described below.

The gate terminal of each of the first and second synchronous rectifying transistors $Q_3$, $Q_4$ in the switching power supply shown in FIG. 5 is turned on by the drain-to-source voltage of the other first and second synchronous rectifying transistors $Q_3$, $Q_4$. However, the gate terminal of each of the first and second synchronous rectifying transistors $Q_3$, $Q_4$ may be turned on by a voltage obtained from the windings of the transformer T.

Figure 13:
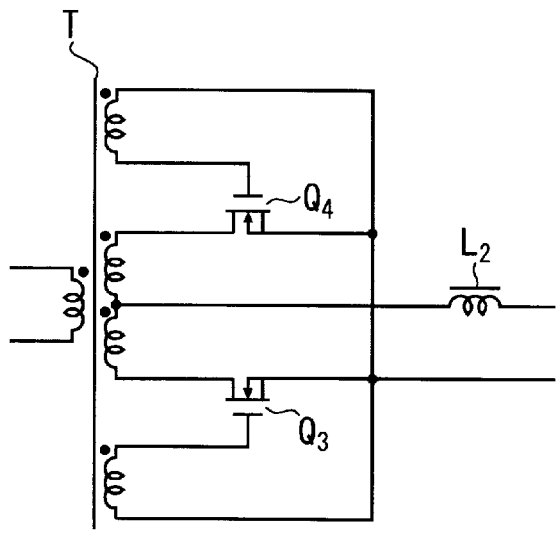
FIG. 13 is a circuit diagram illustrative of another process of driving synchronous rectifying MOSFETs.

Another process of driving the first and second synchronous rectifying transistors $Q_3$, $Q_4$ is shown in FIG. 13. A switching power supply shown in FIG. 13 operates in a manner equivalent to the switching power supply shown in FIG. 5.

Figure 14:
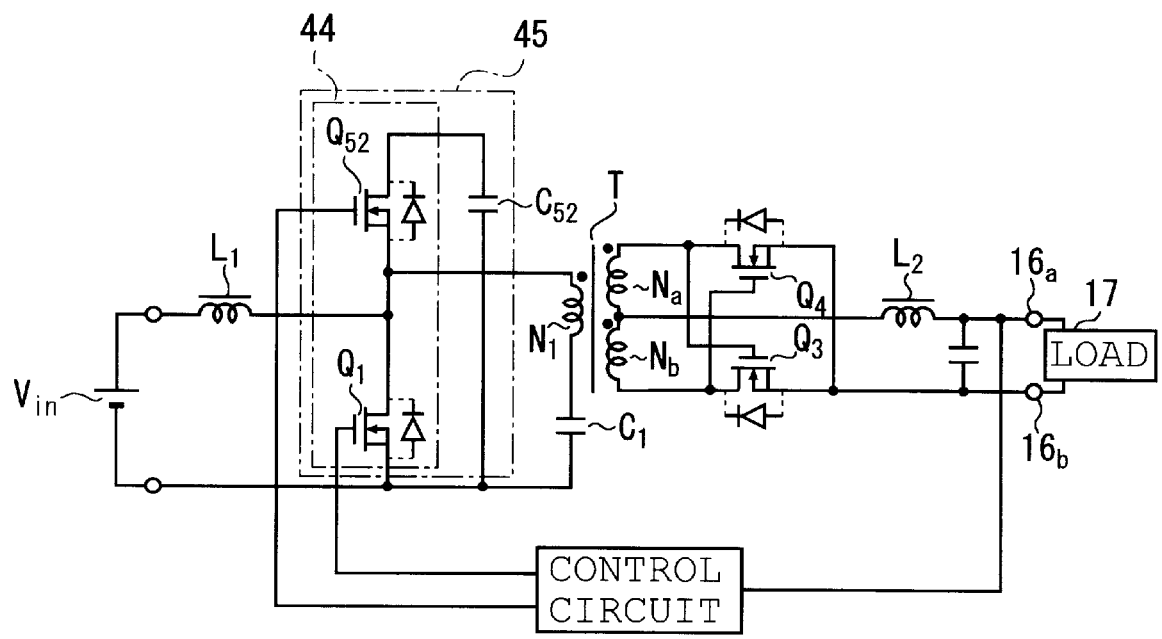
FIG. 14 is a circuit diagram of a switching power supply according to a second embodiment of the present invention.

In the switching power supply according to the second embodiment shown in FIG. 14, the source terminal of a second switching element $Q_{52}$ is connected to the drain terminal of the first switching element $Q_1$, and the first and second switching element $Q_1$, $Q_{52}$ are connected in series with each other, thus jointly making up a series-connected circuit 44. A second capacitor $C_{52}$ is connected parallel to the series-connected circuit 44, jointly making up a parallel-connected circuit 45.

The switching power supply shown in FIG. 14 is equivalent to the switching power supply shown in FIG. 5, and operates in the same manner as the switching power supply shown in FIG. 5. The switching power supply shown in FIG. 14 is equivalent to the switching power supply shown in FIG. 5 for the reasons which will be described below with reference to FIGS. 15a and 15b.

Figure 15A:
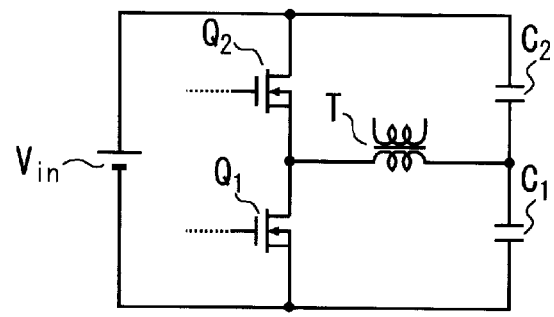
FIGS. 15a and 15b are circuit diagrams illustrative of the manner in which the switching power supply according to the second embodiment of the present invention operates.
Figure 15B:
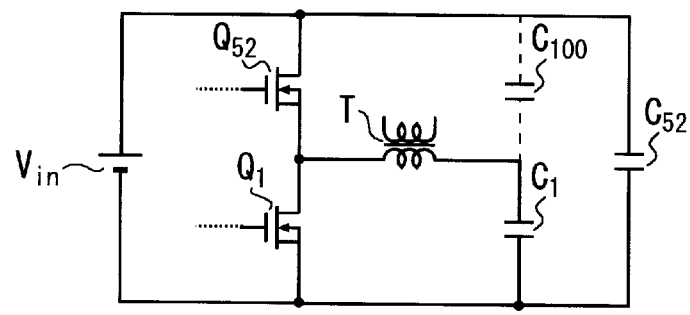

FIGS. 15a and 15b show half-bridge circuits which correspond to the switching power supplies according to the first and second embodiments, respectively. In FIG. 15a, the second switching element $Q_2$ and the second capacitor $C_2$ are connected in series with each other. In FIG. 15b, the second switching element $Q_{52}$ and the second capacitor $C_{52}$ are connected in series with each other. If the capacitor $C_{52}$ shown in FIG. 15b has a capacitance equivalent to the combined capacitance of the series-connected capacitors $C_1$, $C_2$, then the capacitor $C_{52}$ shown in FIG. 15b may be replaced with a capacitor $C_{100}$ shown in FIG. 15b which has the same capacitance as the capacitance of the capacitor $C_2$.

Therefore, the switching power supply shown in FIG. 14 offers the same advantages as those of the switching power supply according to the second embodiment shown in FIG. 5.

Figure 16:
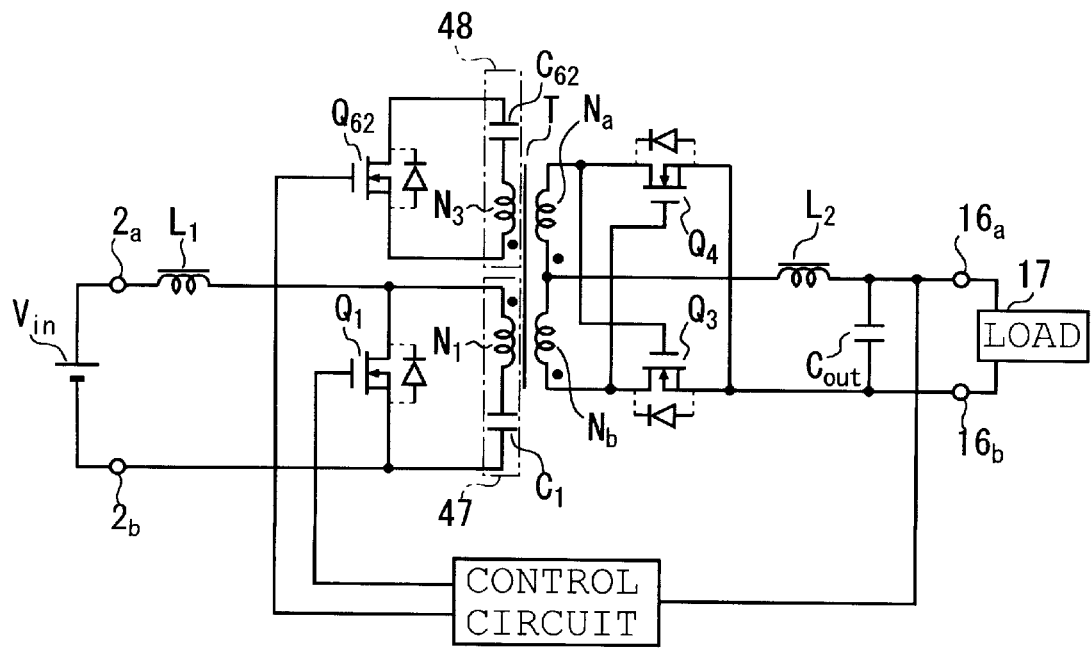
FIG. 16 is a circuit diagram of a switching power supply according to a third embodiment of the present invention.

FIG. 16 shows a switching power supply according to a third embodiment of the present invention. In the switching power supply shown in FIG. 16, the first choke coil $L_1$ has a terminal connected to the input terminal $2_a$ which is connected to the positive-voltage terminal of the input power supply $V_{in}$. The other terminal of the first choke coil $L_1$ is connected to a terminal of the primary winding $N_1$ of a transformer T. The other terminal of the primary winding $N_1$ is connected by the first capacitor $C_1$ to the input terminal $2_b$ which is kept at ground potential.

The primary winding $N_1$ and the first capacitor $C_1$ jointly make up a series-connected circuit 47. The first switching element $Q_1$ which comprises an n-channel MOSFET is connected parallel to the series-connected circuit 47. The first switching element $Q_1$ has a source terminal connected to ground and a drain terminal connected to the junction between the first choke coil $L_1$ and the primary winding $N_1$.

The parts connected to the first and second secondary windings $N_a$, $N_b$ of the transformer T are identical to those of the switching power supply according to the first embodiment. The first and second secondary windings $N_a$, $N_b$ are magnetically coupled to the primary winding $N_1$ of the transformer T. The switching power supply shown in FIG. 16 additionally has a tertiary winding $N_3$ magnetically coupled to the primary winding $N_1$ and the first and second secondary windings $N_a$, $N_b$.

The tertiary winding $N_3$ has a terminal connected by a second capacitor $C_{62}$ to the drain terminal of a second switching element $Q_{62}$ which comprises an n-channel MOSFET. The other terminal of the tertiary winding $N_3$ is connected to the source terminal of the second switching element $Q_{62}$.

The tertiary winding $N_3$ and the second capacitor $C_{62}$ jointly make up a series-connected circuit 48. The second switching element $Q_{62}$ is connected parallel to the series-connected circuit 48.

The terminal of the tertiary winding $N_3$ which is connected to the second switching element $Q_{62}$ is of the same polarity as that of the terminal of the primary winding $N_1$ which is connected to the drain terminal of the first switching element $Q_1$.

Operation of the switching power supply shown in FIG. 16 will be described below. After a voltage from the input power supply $V_{in}$ is applied between the input terminals $2_a$, $2_b$, when the first switching element $Q_1$ is turned on with the second switching element $Q_{62}$ being turned off, electric energy is supplied from the input power supply $V_{in}$, causing a current to flow through the first choke coil $L_1$ to the first switching element $Q_1$ along a path indicated by $J_{11}$ in FIG. 17.

Figure 18:
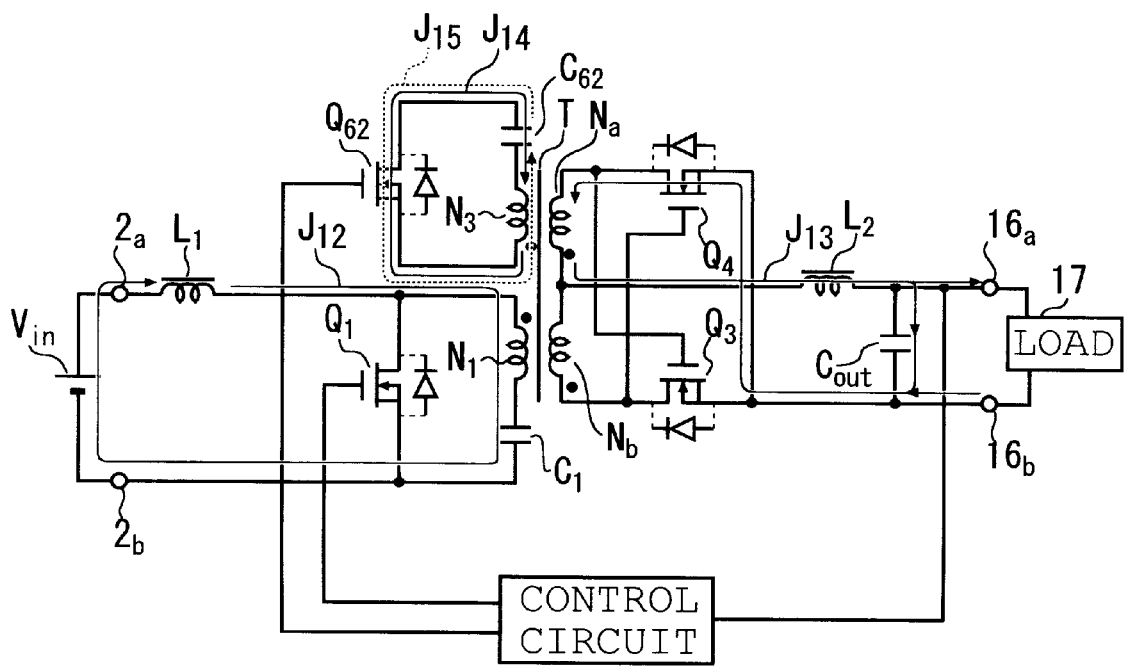
FIG. 18 is a circuit diagram showing current paths in the switching power supply according to the third embodiment of the present invention.

When the first switching element $Q_1$ is then turned off, a current flows along a path indicated by $J_{12}$ in FIG. 18 due to an electromotive force developed across the first choke coil $L_1$.

The current starts to flow from the terminal of the first choke coil $L_1$ where a positive voltage is induced, and flows through the primary winding $N_1$, thereby inducing voltages across the respective first and second secondary windings $N_a$, $N_b$. The current flowing through the primary winding $N_1$ flows into the first capacitor $C_1$, thus charging first capacitor $C_1$. The current thus passes through the input power supply $V_{in}$, and flows back to the terminal of the first choke coil $L_1$ where a negative voltage is induced.

After the current has started to flow along the path indicated by $J_{12}$ in FIG. 18 (at this time, the first switching element $Q_1$ has changed from the on-state to the off-state), when the second switching element $Q_{62}$ is turned on, a current flows from the source terminal to drain terminal of the second switching element $Q_{62}$ along a path indicated by $J_{14}$ in FIG. 18 due to an electromotive force developed across the tertiary winding $N_3$, charging the second capacitor $C_{62}$.

The first and second capacitors $C_1$, $C_{62}$ are thus charged when the first and second switching element $Q_1$, $Q_{62}$ are alternately rendered conductive.

The state in which the first and second capacitors $C_1$, $C_{62}$ are charged is referred to as a steady state. When the second switching element $Q_{62}$ is rendered conductive with the second capacitor $C_{62}$ being charged, a current flows along a path indicated by $J_{15}$ in FIG. 18 due to the discharging of the second capacitor $C_{62}$ at the same time that the current flows along the path indicated by $J_{14}$. The current flowing along the path indicated by $J_{15}$ is opposite in direction to the current flowing along the path indicated by $J_{14}$, and these current cancel out each other.

At this time, voltages are induced respective across the first and second secondary windings $N_a$, $N_b$ by the current flowing through the primary winding $N_1$. The induced voltages are of such polarity that the second synchronous rectifying transistor $Q_4$ is turned on, and a current flows from the terminal of the first secondary windings $N_a$ where a positive voltage is induced, through the second choke coil $L_2$, the output capacitor $C_{out}$ (or the load), the source terminal of the second synchronous rectifying transistor $Q_4$, and the drain terminal thereof, to the terminal of the first secondary windings $N_a$ where a negative voltage is induced, along a path indicated by $J_{13}$ in FIG. 18.

Figure 17:
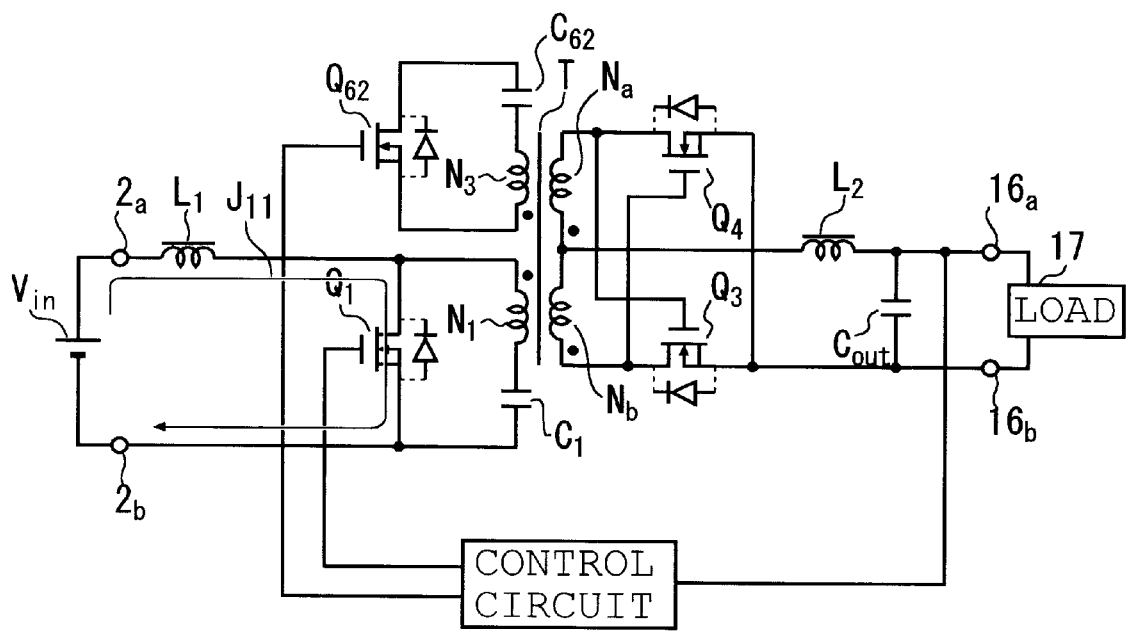
FIG. 17 is a circuit diagram showing a current path in the switching power supply according to the third embodiment of the present invention.
Figure 19:
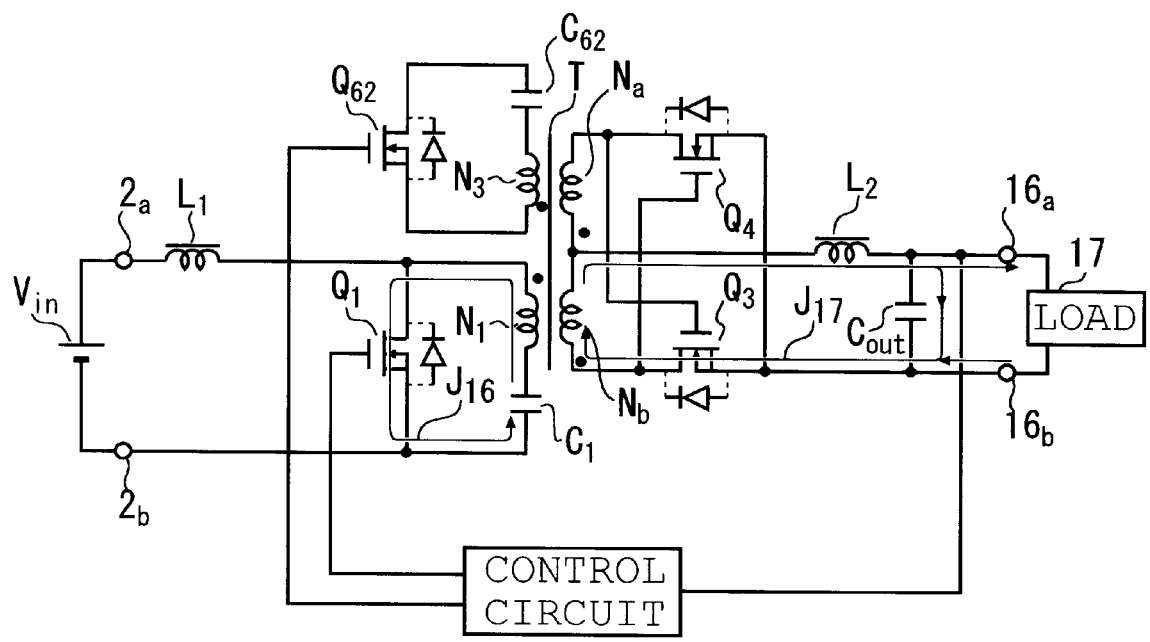
FIG. 19 is a circuit diagram showing current paths in the switching power supply according to the third embodiment of the present invention.

When the second switching element $Q_{62}$ is turned off and the first switching element $Q_1$ is turned on, a current is supplied from the input power supply $V_{in}$ along the path indicated by $J_{11}$ in FIG. 17, and the first capacitor $C_1$ is discharged along a path indicated by $J_{16}$ in FIG. 19.

Because of the discharging of the first capacitor $C_1$, a current flows through the primary winding $N_1$, turning on the first synchronous rectifying transistor $Q_3$, and a current flows along a path indicated by $J_{17}$ in FIG. 19.

When the first and second switching elements $Q_1$, $Q_{62}$ are thus alternately rendered conductive, the first and second synchronous rectifying transistors $Q_3$, $Q_4$ are also alternately rendered conductive, supplying electric energy to the output capacitor $C_{out}$ and the load. While voltages are being induced across the first and second secondary windings $N_a$, $N_b$, the first synchronous rectifying transistor $Q_3$ or the second synchronous rectifying transistor $Q_4$ is rendered conductive, with no current flowing through the internal parasitic diode. This operation is the same as the operation of the switching power supplies according to the first and second embodiments.

In the switching power supply according to the third embodiment shown in FIG. 16, voltages can be converted from the secondary side to the primary side of the transformer T with the turns ratio of the transformer T. The switching power supply according to the third embodiment has an equivalent circuit which is the same as the equivalent circuit of the switching power supply according to the first embodiment shown in FIG. 5. The switching power supply according to the third embodiment shown in FIG. 16 offers the same advantages as those of the switching power supply according to the first embodiment shown in FIG. 5.

According to the present invention, either one of the first and second synchronous rectifying transistors $Q_3$, $Q_4$ is energized at all times except for the short off-times $T_{off31}$, $T_{off32}$. Therefore, the first and second synchronous rectifying transistors $Q_3$, $Q_4$ may be of small dielectric strength and small on-state resistance, and at the same time the output filter may be small. Consequently, the switching power supply may be highly efficient in operation.

It is thus possible according to the present invention to make a highly efficient switching power supply with a low-voltage (e.g., 5 V or 3.3 V), high-current output capability for use in the field of communications or the like.

Although certain preferred embodiments of the present invention have been shown and described in detail, it should be understood that various changes and modifications may be made therein without departing from the scope of the appended claims.

What is claimed is:

1. A power supply circuit comprising:

first and second choke coils;

first and second capacitors;

first and second switching elements each comprising a MOSFET;

first and second synchronous rectifying transistors each comprising a MOSFET;

a transformer having a primary winding and first and second secondary windings which are magnetically coupled to said primary winding;

said first and second switching elements being connected in series with each other at a junction, jointly making up a series-connected circuit, said primary winding and said first choke coil having respective terminals connected to said junction between the first and second switching elements;

said first and second capacitors being connected in series with each other at a junction, jointly making up a series-connected circuit, said primary winding having another terminal connected to said junction between the first and second capacitors;

said series-connected circuit of the first and second switching elements and said series-connected circuit of the first and second capacitors being connected parallel to each other, jointly making up a parallel-connected circuit; and a power supply, operably connected to a terminal of said parallel-connected circuit and another terminal of said first choke coil, for applying a voltage between said terminal of said parallel-connected circuit and said another terminal of said first choke coil wherein when said first and second switching elements are alternately tuned on, an alternating current flows through said primary winding to induce alternating-current voltages respectively across said first and second secondary windings for thereby alternately turning on said first and second synchronous rectifying transistors to cause a current to flow alternatively through said first and second secondary windings for supplying a current to said second choke coil.

2. A power supply circuit comprising:

first and second choke coils;

first and second capacitors;

first and second switching elements each comprising a MOSFET;

first and second synchronous rectifying transistors each comprising a MOSFET;

a transformer having a primary winding and first and second secondary windings which are magnetically coupled to said primary winding;

said first and second switching elements being connected in series with each other at a junction, jointly making up a series-connected circuit, said primary winding and said first choke coil having respective terminals connected to said junction between the first and second switching elements;

said second capacitor being connected parallel to said series-connected circuit of the first and second switching elements, jointly making up a parallel-connected circuit;

said parallel-connected circuit having a terminal connected by said first capacitor to another terminal of said primary winding; and a power supply, operably connected to said parallel-connected circuit, said first capacitor, and another terminal of said first choke coil, for applying a voltage between a junction between said parallel-connected circuit and said first capacitor, and said another terminal of said first choke coil, wherein when said first and second switching elements are alternately turned on, an alternating current flows through said primary winding to induce alternating-current voltages respectively across said first and second secondary windings for thereby alternately turning on said first and second synchronous rectifying transistors to cause a current to flow alternatively through said first and second secondary windings for supplying a current to said second choke coil.

3. A power supply circuit comprising:

first and second choke coils;

first and second capacitors;

first and second switching elements each comprising a MOSFET;

first and second synchronous rectifying transistors each comprising a MOSFET;

a transformer having a primary winding, first and second secondary windings which are magnetically coupled to said primary winding, and a tertiary winding which is magnetically coupled to said primary winding and said first and second secondary windings;

said primary winding and said first capacitor being connected in series with each other, jointly making up a series-connected circuit, said first switching element being connected parallel to said series-connected circuit of the primary winding and the first capacitor, jointly making up a parallel-connected circuit;

said parallel-connected circuit having a terminal connected to a terminal of said first choke coil; and a power supply, operably connected to another terminal of said parallel-connected circuit and another terminal of said first choke coil, for applying a voltage between said another terminal of said parallel-connected circuit and said another terminal of said first choke coil;

said tertiary winding and said second capacitor being connected in series with each other, jointly making up a series-connected circuit, said second switching element being connected parallel to said series-connected circuit of the tertiary winding and the second capacitor, wherein when said first and second switching elements are alternately turned on, an alternating current flows through said primary winding to induce alternating-current voltages respectively across said first and second secondary windings for thereby alternately turning on said first and second synchronous rectifying transistors to cause a current to flow alternately through said first and second secondary windings for supplying a current to said second choke coil.

4. A power supply circuit according to any one of claims 1 through 3, wherein said first and second secondary windings have respective terminals connected to each other at a junction, said second choke coil having a terminal connected to said junction between said first and second secondary windings, and wherein said first and second secondary windings have respective other terminals connected to each other by said first or second synchronous rectifying transistor at a junction, with an output voltage being extracted between the junction between the other terminals of the first and second secondary windings and another terminal of said second choke coil, the arrangement being such that a voltage at the other terminal of the second secondary winding is applied to a gate terminal of one of said first and second synchronous rectifying transistors which is connected to said first secondary winding, and a voltage at the other terminal of the first secondary winding is applied to a gate terminal of one of said first and second synchronous rectifying transistors which is connected to said second secondary winding.

5. A power supply circuit according to claim 4, wherein either one of said first and second switching elements is turned on for an on-time except for a relatively short off-time in which both of said first and second switching elements are prevented from being turned on at the same time, said on-time being variable to keep constant the output voltage extracted from said second choke coil.

6. A power supply circuit according to claim 5, further comprising an output capacitor for smoothing said output voltage.

* * * * *